United States Patent
Nakagawa et al.

(10) Patent No.: US 11,701,843 B2
(45) Date of Patent: Jul. 18, 2023

(54) METHOD AND RESIN IMPREGNATING DEVICE FOR PRODUCING A REINFORCING BAR

(71) Applicant: NAKAGAWA SANGYO Co., Ltd., Inuyama (JP)

(72) Inventors: Hiroshige Nakagawa, Inuyama (JP); Noriaki Nakagawa, Inuyama (JP)

(73) Assignee: NAKAGAWA SANGYO CO., LTD., Inuyama (JP)

( * ) Notice: Subject to any disclaimer, the term of this patent is extended or adjusted under 35 U.S.C. 154(b) by 0 days.

(21) Appl. No.: 17/645,651

(22) Filed: Dec. 22, 2021

(65) Prior Publication Data

US 2022/0203634 A1   Jun. 30, 2022

(30) Foreign Application Priority Data

Dec. 28, 2020   (JP) .................. 2020-218104

(51) Int. Cl.
  *B29C 70/52*   (2006.01)
  *E04C 5/07*   (2006.01)
  *C08J 5/04*   (2006.01)

(52) U.S. Cl.
  CPC .......... *B29C 70/522* (2013.01); *B29C 70/526* (2013.01); *C08J 5/0405* (2021.05); *E04C 5/073* (2013.01); *C08J 2323/12* (2013.01)

(58) Field of Classification Search
  CPC ...... B29C 70/52; B29C 70/522; B29C 70/526
  See application file for complete search history.

(56) References Cited

U.S. PATENT DOCUMENTS

| 4,569,471 | A | | 2/1986 | Ingemansson et al. |
| 4,770,832 | A | | 9/1988 | Okamoto et al. |
| 5,206,085 | A | | 4/1993 | Nakagawa et al. |
| 5,268,050 | A | * | 12/1993 | Azari ............... B29C 48/06 425/114 |

(Continued)

FOREIGN PATENT DOCUMENTS

| EP | 0170499 A2 | 2/1986 |
| EP | 0303499 A1 | 2/1989 |

(Continued)

OTHER PUBLICATIONS

Office Action from the Japanese Patent Office dated Jan. 18, 2022 in related Japanese application No. 2021-205638, and machine translation thereof.

(Continued)

*Primary Examiner* — Matthew J Daniels
(74) *Attorney, Agent, or Firm* — J-Tek Law PLLC; Jeffrey D. Tekanic; Scott T. Wakeman (57) ABSTRACT

A resin impregnating device (1) is used in a method for producing a reinforcing bar and has a chamber for holding a liquid thermoplastic resin. A plurality of guide plates (4A-4C) is arranged in the chamber along a traveling direction of a plurality of strands of reinforcing fiber material (Fb). Through holes (41) in two of the guide plates (4A, 4C) guide or spread the strands of the reinforcing fiber material Fb away from each other, and a single through hole (42) in an intermediate one of the guide plates (4B) guides or converges all the strands of the reinforcing fiber material (Fb) towards each other.

20 Claims, 7 Drawing Sheets

(56) References Cited

U.S. PATENT DOCUMENTS

| | | | |
|---|---|---|---|
| 5,540,797 A * | 7/1996 | Wilson | B29C 70/521 425/114 |
| 5,879,602 A * | 3/1999 | Scheuring | B29B 7/90 425/114 |
| 5,989,376 A * | 11/1999 | Kusy | B29B 15/122 156/441 |
| 6,007,655 A | 12/1999 | Gorthala et al. | |
| 6,270,851 B1 * | 8/2001 | Lee | B29C 70/50 156/441 |
| 2015/0284886 A1 | 10/2015 | Ohtani et al. | |
| 2022/0072814 A1 | 3/2022 | Nakagawa et al. | |
| 2022/0161479 A1 | 5/2022 | Nakagawa et al. | |
| 2022/0234254 A1 | 7/2022 | Nakagawa et al. | |
| 2022/0282649 A1 | 9/2022 | Nakagawa et al. | |

FOREIGN PATENT DOCUMENTS

| | | |
|---|---|---|
| JP | S53159115 U | 12/1978 |
| JP | S58132514 A | 8/1983 |
| JP | S6135232 A | 2/1986 |
| JP | S6445832 A | 2/1989 |
| JP | H0480451 A | 3/1992 |
| JP | H04278311 A | 10/1992 |
| JP | H07252372 A | 10/1995 |
| JP | 2000254978 A | 9/2000 |
| JP | 2002054270 A | 2/2002 |
| JP | 2008266648 A | 11/2008 |
| JP | 2009090474 A | 4/2009 |
| JP | 2011167804 A | 9/2011 |
| JP | 2012251378 A | 12/2012 |
| JP | 2018030318 A | 3/2018 |
| JP | 2018123180 A | 8/2018 |
| JP | 2020111989 A | 7/2020 |
| WO | 2014061384 A1 | 4/2014 |
| WO | 2017043654 A1 | 3/2017 |
| WO | 2020060506 A1 | 3/2020 |

OTHER PUBLICATIONS

Office Action from the Japanese Patent Office dated Dec. 2, 2021, in related JP application No. 2021-187527, and machine translation thereof.

Office Action from the Japanese Patent Office dated Jan. 12, 2022, in related JP application No. 2021-187527, and machine translation thereof.

Office Action from the Japanese Patent Office dated Jan. 28, 2022, in related JP application No. 2021-206703, and machine translation thereof.

Office Action from the Japanese Patent Office dated May 25, 2022, in related JP application No. 2021-206703, and machine translation thereof.

Office Action from the Japanese Patent Office dated Nov. 1, 2021, in related JP application No. 2021-142043, and machine translation thereof.

* cited by examiner

METHOD AND RESIN IMPREGNATING DEVICE FOR PRODUCING A REINFORCING BAR

CROSS-REFERENCE TO RELATED APPLICATION

The present application claims priority to Japanese patent application No. 2020-218104 filed on Dec. 28, 2020, the contents of which are hereby fully incorporated herein by reference.

BACKGROUND OF THE INVENTION

Technical Field

The present invention generally relates to a method for producing a reinforcing bar ("rebar") that may be suitably used for reinforcement of concrete and the like, and to a resin impregnating device that may be suitably used in such a method.

Related Art

Basalt fiber has been used in such a reinforcing bar ("rebar"), because basalt fiber does not rust and it enables the tensile strength of concrete to be maintained for an extended period of time. Therefore, such reinforcing bars have been gaining attention as a replacement for conventional reinforcing bars made of iron. As disclosed in Japanese Patent Laid-Open Publication No. 2012-251378, for example, a reinforcing bar having a structure obtained by covering the circumference of a core material, which is a bundle of basalt fibers, with a thermoplastic polymer (resin) layer having a predetermined thickness has been proposed. As a conventional method for forming the polymer (resin) layer around the core material, a resin immersion or impregnation method has been widely used in which the core material is immersed in a bath of molten polymer (resin solution), such as is disclosed in the above-noted Japanese Patent Laid-Open Publication No. 2012-251378.

SUMMARY

However, the above-described known resin impregnating method suffers from the problem that it is not capable of producing a reinforcing bar having sufficient strength because the basalt fibers, which is the reinforcing fiber material, are insufficiently impregnated with the thermoplastic resin (polymer) material.

It is therefore one, non-limiting object of the present teachings to disclose techniques for improving a method for producing a reinforcing bar ("rebar") in which a reinforcing fiber material is sufficiently impregnated and integrated with a thermoplastic polymer (resin) material whereby sufficient strength is achieved, and to disclose techniques for improving a resin impregnating device that may be used in such a method.

In a first non-limiting aspect of the present teachings, a method of producing a reinforcing bar, in which a reinforcing fiber material is impregnated and integrated with a thermoplastic polymer (resin) material, may include: passing a plurality of pieces (strands) of the reinforcing fiber material through a bath (storage tank, reservoir) that holds the thermoplastic resin material in a liquid form; and repeating at least once outwardly spreading the plurality of pieces (strands) and then inwardly converging the pieces (strands) of the reinforcing fiber material in a direction perpendicular to the traveling (moving) direction of the pieces (strands) of reinforcing fiber material through the bath.

According to the first aspect of the present teachings, because the steps of at least once outwardly spreading and then inwardly converging the pieces (strands) of the reinforcing fiber are performed while the pieces (strands) of the reinforcing fiber are immersed in and pass through the liquid thermoplastic resin material, impregnation (coating) of the reinforcing fibers with the thermoplastic resin is promoted, whereby a reinforcing bar having sufficient strength can be obtained owing to the thorough integration/incorporation of the thermoplastic resin (polymer) with the reinforcing fibers.

According to a second aspect of the present teachings, the reinforcing fiber material is loosened prior to passing the strands through the liquid resin bath (storage tank, reservoir).

In the second aspect of the present teachings, the reinforcing fiber material can be more efficiently impregnated with the thermoplastic resin (polymer) because it is loosened prior to immersion in the liquid thermoplastic resin (polymer).

According to a third aspect of the present teachings: the above-noted bath (storage tank, reservoir) is configured as a box-like shaped resin impregnating device (1) and includes a plurality of guide members (4A, 4B) arranged in a hollow space (chamber for holding the liquid thermoplastic resin (polymer)) within the resin impregnating device (1) along the traveling (moving) direction of the reinforcing fiber material (Fb). One (4A) of the plurality of guide members guides the reinforcing fiber material (Fb) such that the pieces (strands) are spread outwardly in the direction perpendicular to the traveling direction. Another one (4B) of the plurality of guide members is adjacent (downstream) thereto and guides the reinforcing fiber material (Fb) such that the pieces (strands) converge inwardly towards each other in the direction perpendicular to the traveling direction.

By using the resin impregnating device according to the third aspect of the present teachings, the method according to the first aspect of the present teachings can be easily realized.

According to a fourth aspect of the present teachings: the one (4A) of the plurality of guide members includes a plurality of through holes (41) that are disposed spaced apart in the direction perpendicular to the traveling direction and respectively guide the pieces (strands) of the reinforcing fiber material (Fb) to be spaced apart from each other; and the other one (4B) of the plurality of guide members has a (single) through hole (42) such that all of the pieces (strands) of the reinforcing fiber material (Fb) pass through the (single) through hole (42) in order to converge (bring together) all of the pieces (strands) of the reinforcing fiber material (Fb) in the direction perpendicular to the traveling direction of the reinforcing fiber material (Fb).

According to the fourth aspect of the present teachings, the respective through holes facilitate guiding of the reinforcing fibers away from each other and then towards each other.

The above numerals in parentheses indicate, for reference and explanatory purposes only, representative, non-limiting correspondence relationships with specific structures described in the below-described embodiment of the present teachings. Such reference numbers are not intended to restrict or limit the scope of the present teachings in any manner.

As described in the foregoing, according to the present teachings, a reinforcing bar having sufficient strength can be obtained because the reinforcing fiber material is sufficiently (thoroughly) impregnated and integrated with the thermoplastic resin material.

DETAILED DESCRIPTION OF PREFERRED EMBODIMENTS

It is noted that the representative exemplary embodiments described below are merely examples of the present teachings, and various design improvements, which may be made by one of ordinary skill in the art without departing from the spirit of the present invention, are also encompassed in the scope of the present invention.

Figure 1:
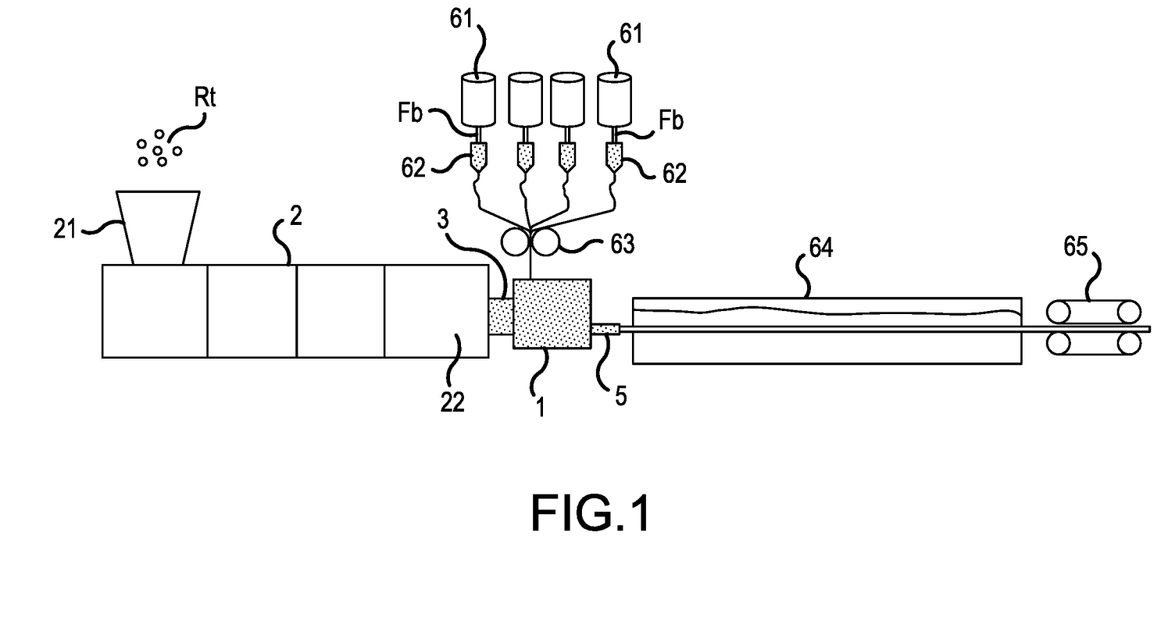
FIG. 1 shows an overall configuration of an apparatus for carrying out a resin (polymer) impregnating method according to the present teachings.

FIG. 1 shows an overall configuration of an apparatus for carrying out a method, in particular, a so-called pultrusion method, for producing a reinforcing bar ("rebar") according to the present teachings, which apparatus is provided with a resin impregnating device (resin coating device) 1. In FIG. 1, an extruder 2 having a well-known structure is provided, and (solid) polypropylene (PP) Rt, which serves as the thermoplastic resin material of the present example, is supplied via a charging hopper 21, which is mounted on an upper face of one end of the extruder 2, into an input opening of the extruder 2. The PP Rt is heated in the extruder 2 to a predetermined temperature to bring it into a molten state, and then the molten PP supplied to the resin impregnating device 1, which is described below in greater detail, that is coupled (fastened, fixed) to the other (output) end of the extruder 2 by one or more screws, bolts, etc., provided therein.

Figure 2:
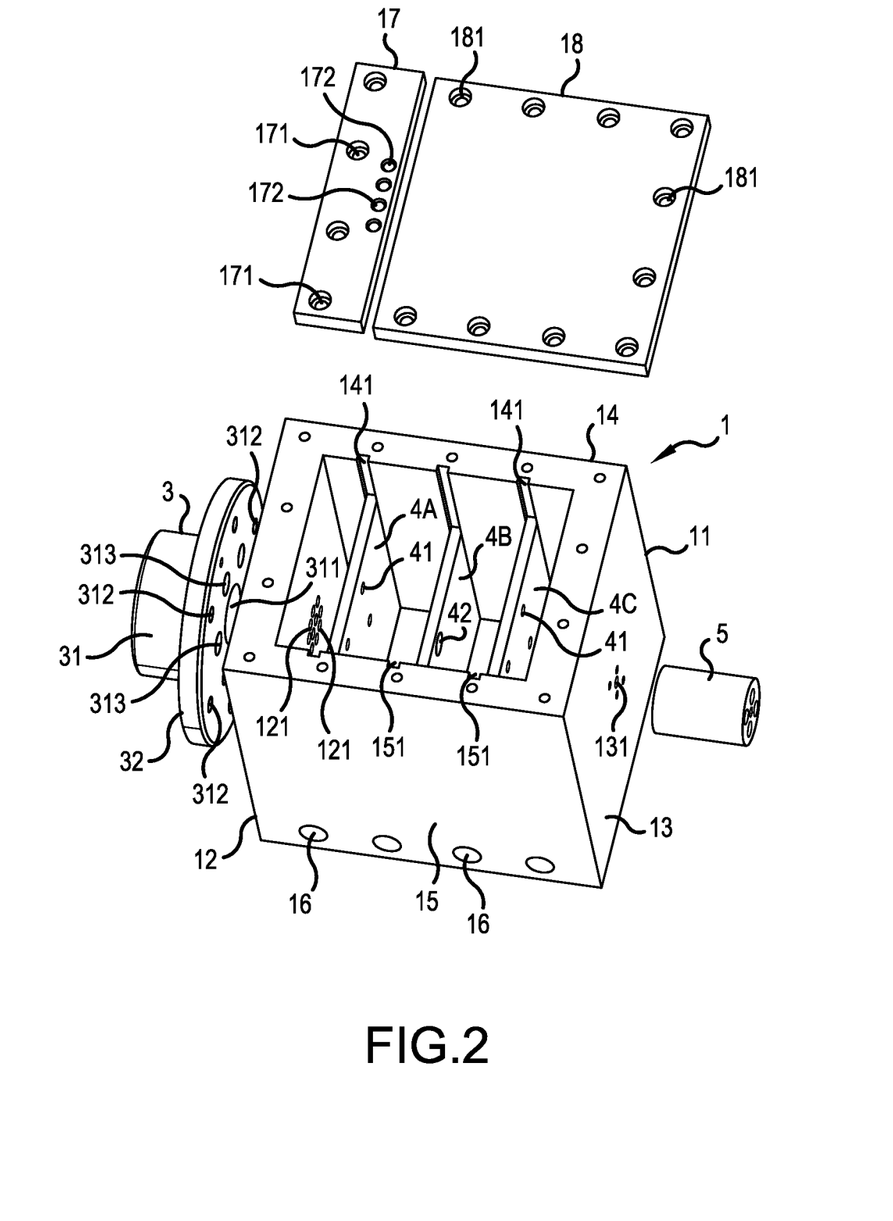
FIG. 2 is an exploded perspective view of a resin impregnating device according to a first embodiment of the present teachings.

A detailed structure of the resin impregnating device 1 is shown in FIG. 2. A main body 11 of the resin impregnating device 1 has a rectangular box-like shape that is open upward to define a hollow space (bath chamber, storage tank, reservoir) therein. A joint coupling 3, which is configured to be joined to the downstream (output) end 22 (FIG. 1) of the extruder 2, is fixed to one end wall 12 of the main body 11. The joint coupling 3 includes a columnar base portion 31 and a large-diameter flange 32 formed on one end thereof. A through hole 311, through which molten PP Rt output from the extruder 2 flows, is formed at the center of the base portion 31. The joint coupling 3 is joined (fastened, fixed) to the end wall 12 of the main body 11 with bolts being respectively inserted into attachment holes 312 formed in an outer peripheral portion of the flange 32, and is joined (fastened, fixed) to the extruder 2 with bolts being respectively inserted into attachment holes 313 that penetrate from an inner peripheral portion of the flange 32 to inside of the cylinder wall of the base portion 31.

Figure 5:
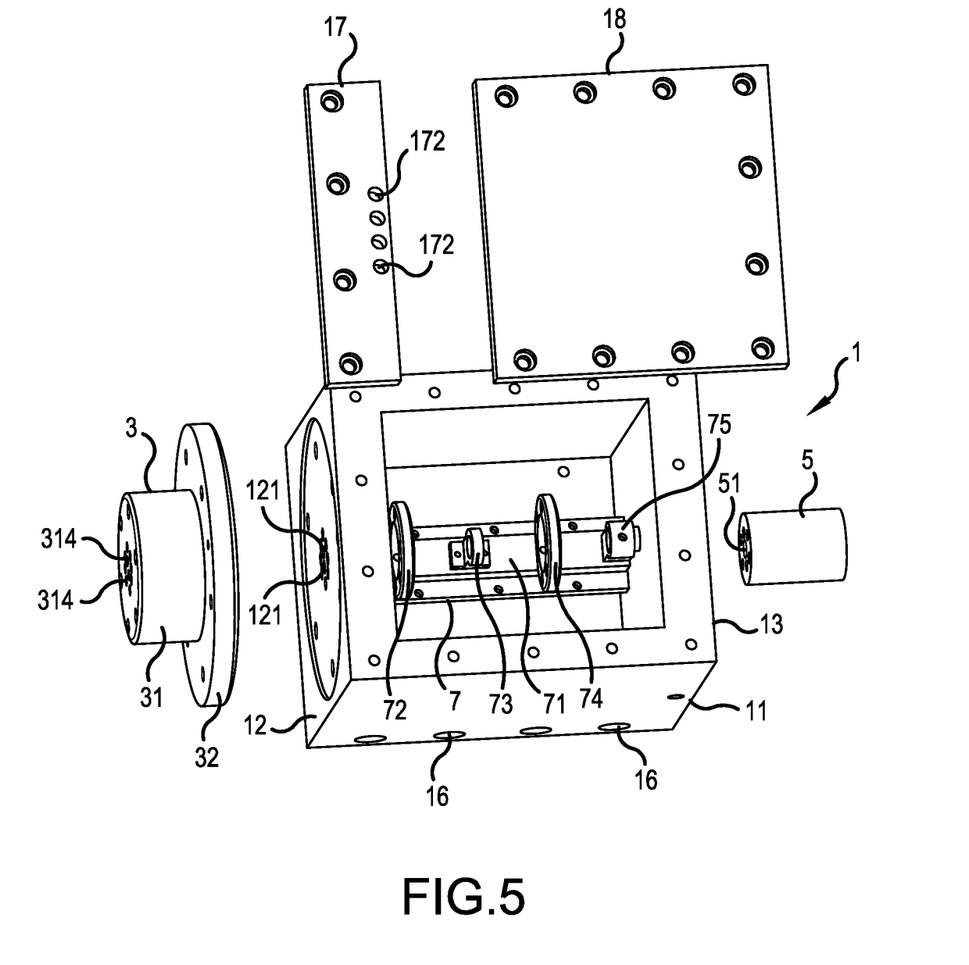
FIG. 5 is an exploded perspective view of a resin impregnating device according to a second embodiment of the present teachings.

On the end wall 12 of the main body 11, a large number of small-diameter through holes 121, which are fluidly connected to the interior of a cylinder (conduit) of the joint coupling 3, are formed within a circular area (see FIG. 5). The molten PP Rt output from the extruder 2 passes through these through holes 121 and flows in a rectified state into the resin bath chamber defined within the main body 11 where the liquid PP Rt pools (is held).

On facing side walls 14, 15 of the interior of the main body 11 of the resin impregnating device 1, multiple (three in the present embodiment) guide grooves 141, 151 extend in an up-down direction down to a bottom wall and are defined at intervals from the end wall 12 to the end wall 13 so as to face each other. Guide plates 4A, 4B, 4C are inserted from an upper side and are thus respectively attached to (disposed within) these guide grooves 141, 151. These guide plates 4A to 4C are immersed in the liquid PP Rt that was fed from the extruder 2 and has pooled (collected) in the resin bath chamber of the resin impregnating device 1.

Figure 3:
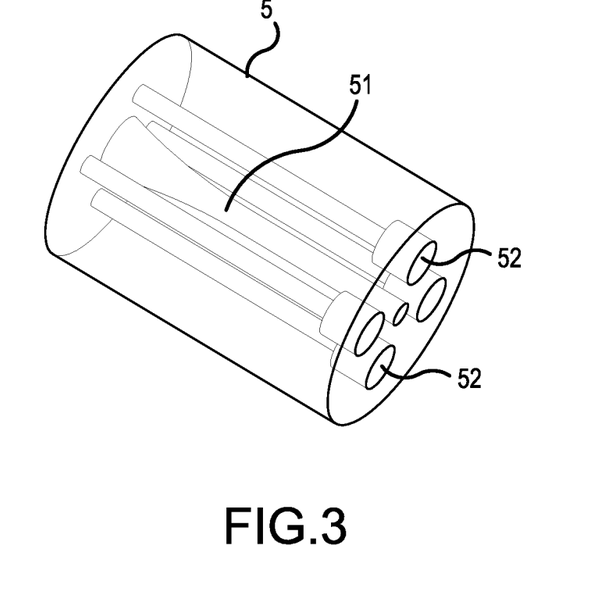
FIG. 3 is a partially transparent perspective view of an output molding portion of the resin impregnating device of FIG. 2.

A columnar shaped molding die 5 is fixed to the end wall 13 of the main body 11 of the resin impregnating device 1. Details of the molding die 5 are shown in the partially transparent view of FIG. 3. A through hole 51 for molding is formed in the center of the molding die 5 and is configured to gradually reduce in diameter (taper) from a base (input) end side to the output side such that the diameter on the downstream (output) end at least approximately matches the desired external diameter of the reinforcing bar that is the end product of the present manufacturing process. The molding die 5 is joined (fastened, fixed) to the end wall 13 of the resin impregnating device 1 with bolts being respectively inserted into a plurality (four in the present embodiment) of attachment through holes 52 formed around (encircling) the through hole 51. When the molding die 5 is fixed to the end wall 13 of the resin impregnating device 1, the through hole 51 of the molding die 5 is fluidly connected to a through hole 131 (FIG. 2) formed in the end wall 13, preferably in a coaxial manner.

Referring again to FIG. 2, a plurality of lateral blind holes 16 is formed in a plurality of positions along the bottom wall of the main body 11 of the resin impregnating device 1; the lateral blind holes 16 open towards a lateral side and are closed in an interior portion of the main body 11. Bar-like heaters for maintaining the molten PP Rt at a predetermined temperature are respectively inserted into these lateral blind holes 16 in order to heat the resin bath chamber and maintain the PP in the molten state.

Figure 4:
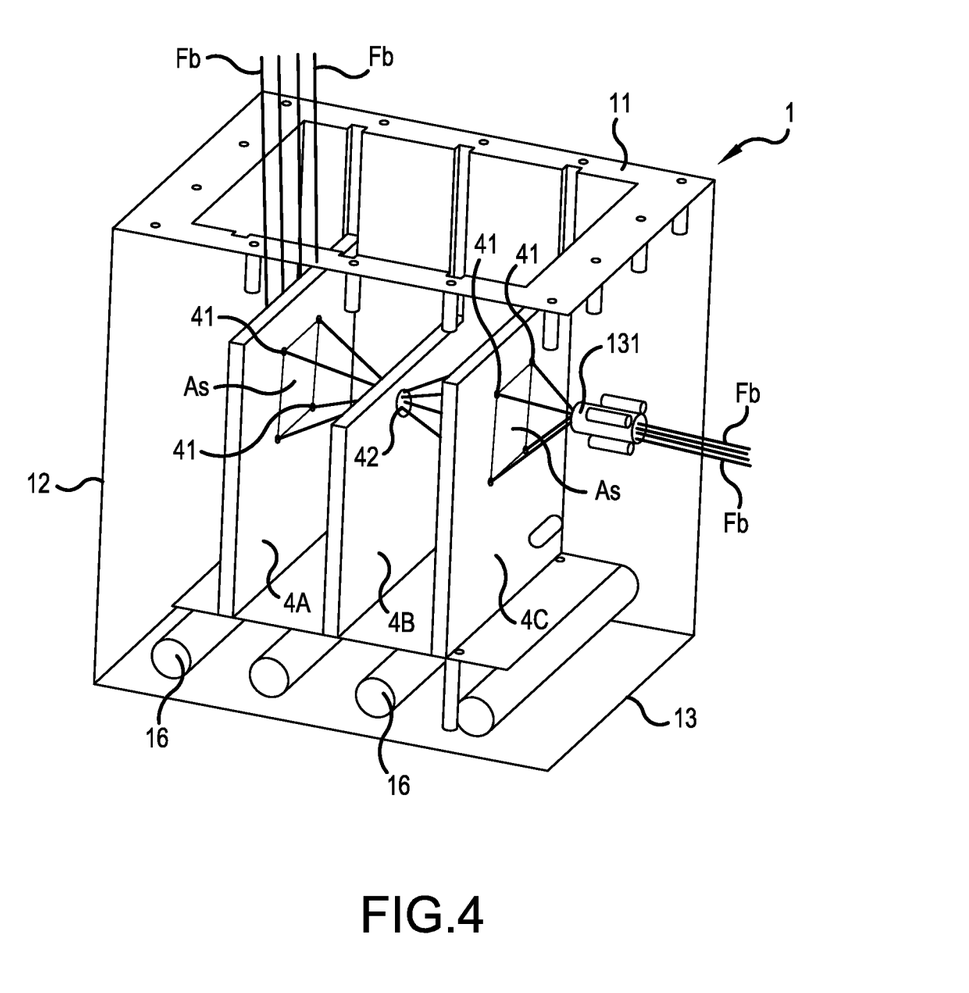
FIG. 4 is a schematic, partially transparent perspective view of the interior of the resin impregnating device of FIG. 2.

FIG. 4 shows details of the guide plates 4A to 4C that are arranged in parallel within the resin bath chamber of the main body 11 of the resin impregnating device 1. Among the guide plates 4A to 4C attached to the guide grooves 141, 151 (FIG. 2), two of the guide plates 4A and 4C are respectively positioned close to the opposite end walls 11, 12 and have the same shape; four small-diameter through holes 41 are formed at respective corners of square areas As on plate surfaces thereof. On the other hand, the guide plate 4B positioned in the middle between the guide plates 4A and 4C has a single larger-diameter through hole 42 formed at a position corresponding to the center of the square areas As.

Referring again to FIG. 2, two lid (cover) plates 17, 18, which are respectively oblong (rectangular) and square, are in contact with each other and are attached to cover the upper side of the box-shaped main body 11 of the resin impregnating device 1. In addition, fiber passage holes 172 are formed at a plurality (four in the present embodiment) of positions along the lid plate 17 at regular intervals in the longitudinal direction thereof, i.e., in the width direction of the resin impregnating device 1. The lid plates 17, 18 are fixed to upper end faces of the end walls 12, 13 and the side walls 14, 15 of the box-shaped main body 11 of the resin impregnating device 1 with bolts respectively inserted into the attachment through holes 171, 181 provided in the lid plates 17, 18.

An exemplary method for producing reinforcing bars ("rebars") will now be described with reference to FIG. 1. As shown therein, basalt fiber bundles Fb, which serve as an exemplary reinforcing fiber material in the present embodiment, are respectively drawn from coils 61 and supplied into the resin impregnating device 1, more specifically, into the bath chamber thereof, to impregnate (coat) the basalt fibers with liquid resin (polymer). The resin-impregnated basalt fibers then exit the resin impregnating device 1 and pass through cooling water in a cooling device (cooling tank) 64. The cooled (solidified) resin-impregnated basalt fibers (i.e. the reinforcing bar) is vertically pinched by pulling belts 65 in order to pull the basalt fibers through the resin impregnating device 1 according to a pultrusion manufacturing method. A non-limiting example of the thickness of each of the basalt fiber bundles Fb is 4,800 TEX.

It is noted that, prior to being inserted (fed) into the resin impregnating device 1, the basalt fiber bundles Fb drawn from the respective coils 61 are each passed through a nozzle 62 and loosened to be partially separated by supplying compressed air into the nozzle 62 perpendicular to the moving direction of the basalt fiber bundle Fb. The loosened basalt fiber bundles Fb are pulled by tension rollers 63 through the nozzles 62 and then passed through the respective fiber passage holes 172 in the lid plate 17 (FIG. 2) of the resin impregnating device 1. Then, as shown in FIG. 4, the spaced-apart basalt fiber bundles Fb that respectively passed through the fiber passage holes 172 are respectively passed through the four through holes 41 that penetrate through the respective corners of the square area As of the guide plate 4A while being immersed in the bath of molten PP Rt, which is held in the main body 11, and maintaining the state of being spaced apart. Thereafter, the spaced-apart basalt fiber bundles Fb are converged (inwardly brought together) by being passed through the (single) through hole 42 formed in the guide plate 4B defined at a position corresponding to the center of the square region As of guide plate 4A, thereby inwardly compressing (pushing) together the resin-impregnated basalt fiber bundles Fb. Then, the compressed-together basalt fiber bundles Fb are outwardly separated again by being respectively passed through the four through holes 41 that penetrate through the respective corners of the square region As of the guide plate 4C. Thereafter, the spaced-apart basalt fiber bundles Fb are converged (inwardly brought together) again by being passed through the (single) through hole 131 in the end wall 13 of the main body 11 that is defined at a position corresponding to the center of the square region As.

As described above, in the present embodiment, the basalt fiber bundles Fb twice undergo a process of outwardly separating and inwardly converging in a direction perpendicular to the traveling direction thereof while passing through the molten PP bath, whereby the basalt fiber bundles Fb are sufficiently impregnated (infiltrated, coated) with molten PP Rt owing to their relative motion back and forth with respect to each other. Preferably, when the basalt fiber bundles Fb are converged together, they touch (or at least the resin on one or more of the strand touches one or more of the other strands) and thus can transfer liquid resin from one strand to another strand, thereby improving coverage (coating) of the strands. Then, the basalt fiber bundles Fb pass through the through hole 131 to reach the through hole 51 of the molding die 5 (FIG. 3), where the basalt fiber bundles Fb are further gradually reduced in diameter (tapered), i.e. squeezed together, to match the external diameter of the desired end product, i.e., the reinforcing bar. Thereafter, the resin-impregnated basalt fiber bundles Fb are cooled in the cooling device 64 (FIG. 1) as described above, whereby a reinforcing bar is obtained that has sufficient strength owing the basalt fibers Fb being sufficiently infiltrated with PP and thoroughly integrated (joined) together.

Note that the through holes 41 in the guide plates 4A, 4C are not necessarily required to be formed at the corners of the square region As, and the through hole 42 in the guide plate 4B is not necessarily required to be formed at a position corresponding to the center of the square region As. In other words, the fiber bundles Fb may be separated and converged using a variety of other geometric configurations. For example, the number of sides of a polygon formed by through holes 41 in the guide plates 4A, 4C optionally may be equal to the number of fiber bundles Fb. In the alternative, the through holes 41 may be defined in (along) an endless shape (loop) such as a circular or oval shape, as will be discussed below.

Second Embodiment

FIG. 5 shows a resin impregnating device 1 according to a second embodiment of the present teachings. The main body 11 of the resin impregnating device 1 has a box-like shape as in the first embodiment, and the joint coupling 3 joined (fixed, fastened) to one end of the main body 11 is also similar to that of the first embodiment except that a large number of small-diameter through holes 314 are formed in a circular area in the center thereof. These through holes 314 are respectively fluidly connected to a large number of through holes 121 formed on the end wall 12 of the main body 11 of the resin impregnating device 1. The molten PP Rt output from the extruder 2 (FIG. 1) passes through these through holes 314, 121 and flows in a rectified state into a bath chamber defined within the main body 11. In addition, the molding die 5 joined (fixed) to the end wall 13 of the main body 11 of the resin impregnating device 1, and the lid (cover) plates 17, 18 attached to cover the main body 11 have the same structure as those of the first embodiment. Therefore, elements/structures that are the same as those of the first embodiment are denoted by the same reference symbols and need not be described again.

Figure 6:
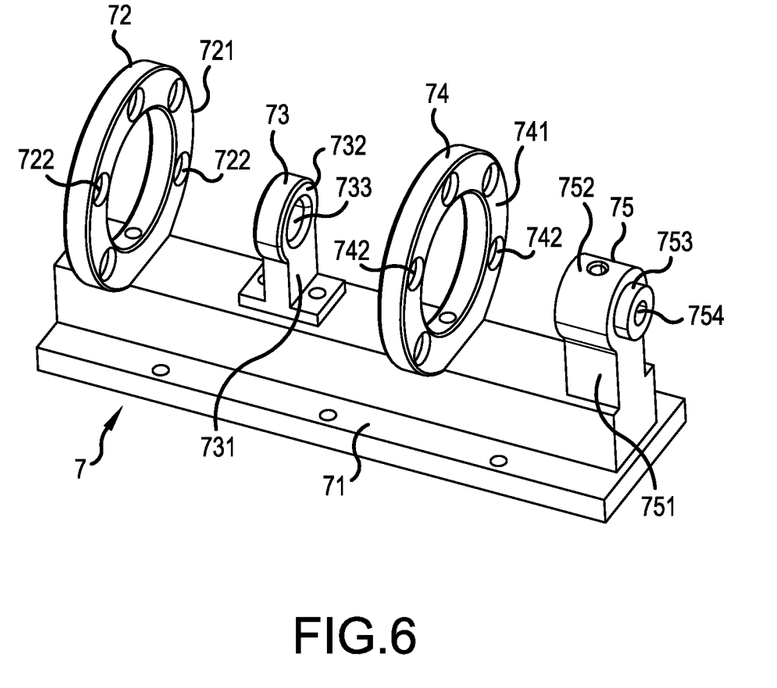
FIG. 6 is a perspective view of a guide member of the resin impregnating device of FIG. 5.

In the present second embodiment, a guiding body 7 is arranged within the bath chamber of the main body 11 of the resin impregnating device 1. Details of the guiding body 7 are shown in FIG. 6. The guiding body 7 is provided with an elongated seat (foundation, base) 71 fixed to the bottom wall of the main body 11 of the resin impregnating device 1. The seat 71 extends from the side of the end wall 12 to the side of the end wall 13 of the main body 11 as shown in FIG. 5. Guide members 72, 73, 74, 75 are installed upright (extend perpendicularly) at predetermined intervals on the seat 71, in this order from a position close to the end wall 12 in a longitudinal direction.

The guide members 72, 74 have the same shape and are formed in ring shapes overall. In ring portions 721, 741 thereof, small-diameter through holes 722, 742 are formed at a plurality (five in the present embodiment) of positions at intervals in the circumferential direction of the ring portions 721, 741. The guide member 73 is obtained by forming a ring portion 732, which has a large-diameter through hole 733 at its center, on a plate-like supporting portion 731. The guide member 75 is obtained by forming a ring-shaped holding portion 752 on a wall-like supporting portion 751. A tubular body 753 having a through hole 754 with a predetermined diameter is detachably held in the holding portion 752. The centers of the ring portions 721, 741 of the guide members 72, 74, and the centers of the through holes 733, 754 of the guide members 73, 75 are positioned (extend) along the same line, i.e., they are coaxial.

Figure 7:
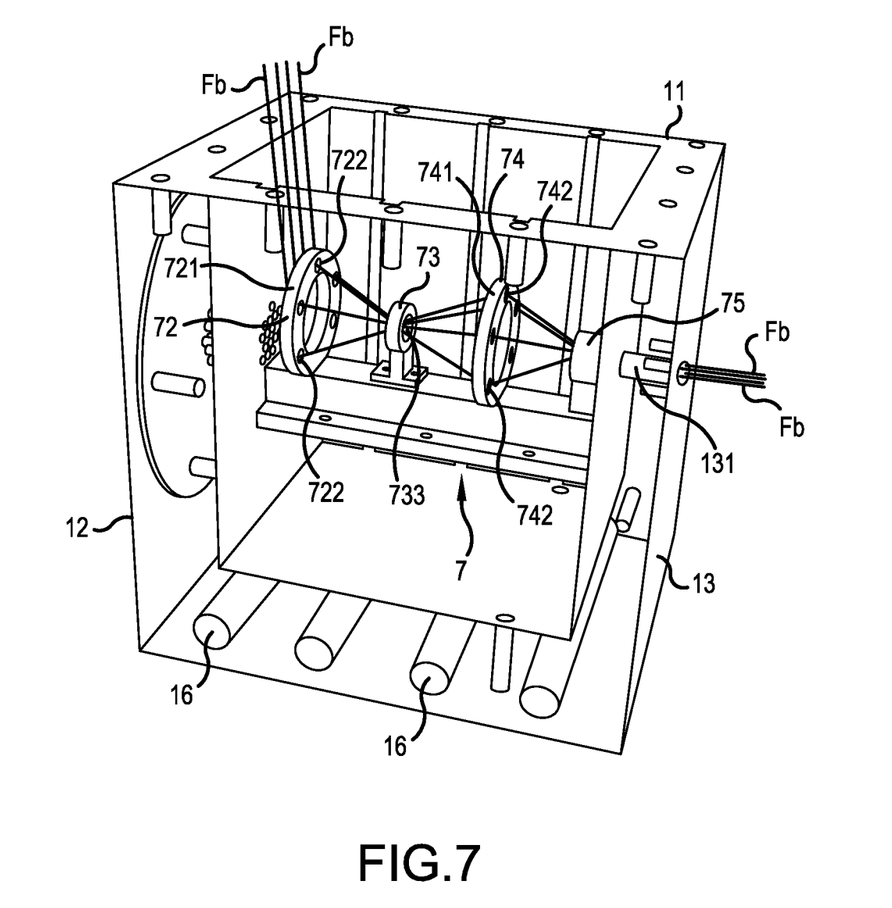
FIG. 7 is a schematic, partially transparent perspective view of the resin impregnating device of FIG. 5.

During production of reinforcing bars, the basalt fiber bundles Fb are respectively passed through the fiber passage holes 172 on the lid plate 17 (FIG. 5) and are then, as shown in FIG. 7: respectively passed through the through holes 722 formed in the ring portion 721 of the guide member 72 while being immersed in the liquid PP Rt in a state of being outwardly spaced apart; and then are inwardly converged (pressed towards each other) by being passed through the through hole 733 of the guide member 73. Subsequently, the basalt fiber bundles Fb are respectively passed through the through holes 742 formed in the ring portion 741 of the guide member 74 to outwardly space apart the fiber bundles Fb again; and then are inwardly converged again (pressed towards each other) by all being passed through the through hole 754 (FIG. 6) of the guide member 75. Note that in FIG. 7, for facilitating understanding, the guiding body 7 and the through hole 131 corresponding thereto on the end wall 13 of the main body 11 are shown to be disposed more upwardly than in actual use, i.e. these structures would ordinarily be disposed much lower so that less molten resin may be held in the bath chamber in order to coat/impregnate the fiber bundles Fb.

As described above, in the present second embodiment as well, the basalt fiber bundles Fb twice undergoing a process of outwardly separating them in a direction perpendicular to the traveling direction thereof and inwardly converging them while passing through the bath of the liquid PP Rt, during which time the basalt fiber Fb are sufficiently impregnated/coated with PP Rt. Then, the basalt fiber bundles Fb pass through the through hole 131 in the end wall 13 of the main body to reach the through hole 51 of the molding die 5 (FIG. 5) that is fluidly connected thereto, where the basalt fiber bundles Fb are further converged (squeezed together) to gradually reduce them in diameter to match the desired external diameter of the end product (i.e. the reinforcing bar), during which time the resin-impregnated basalt fibers Fb are integrated (joined) and then subsequently cooled in the cooling device 64 (FIG. 1), whereby a reinforcing bar having sufficient strength is obtained. An example of the diameter of the reinforcing bar is approximately 5 mm, and the tensile strength of the reinforcing bar thus obtained is about 15 kN.

Note that the centers of the ring portions 721, 741 of the guide members 72, 74, and the centers of the through holes 733, 754 of the guide members 73, 75 are not necessarily required to be positioned (extend) along the same line, i.e. they need not be coaxially aligned.

In the embodiments described above, the process of outwardly spreading the basalt fibers and inwardly converging them is repeated twice; however, this spreading-converging process may also be performed only once or may be repeated three times or more to achieve a desired impregnation (coating) state of the fibers with the liquid resin.

In the embodiments described above, the basalt fiber bundles are loosened before being fed into the resin impregnating device 1; however, this loosening step is not essential.

Furthermore, in the embodiments described above, the basalt fibers are outwardly and inwardly guided by the through holes; however, the basalt fibers may also be guided by structures other than the through holes, such as hooks or other curved, open structures.

In addition or in the alternative to PP, the thermoplastic polymer (resin) material of the above-described embodiment may be or include, e.g., polyethylene, nylon, polyester, or the like. In addition or in the alternative to basalt fibers, the reinforcing fibers may be or include another type of inorganic fiber, such as, e.g., glass fiber or carbon fiber, and/or may be an organic fiber such as aramid fiber or acrylic fiber.

As was noted above, the through holes 41, 722 in the first guide plate 4A, 72 of the first and second embodiments may be arranged, e.g., in a polygonal shape or an endless curved (loop) shape (e.g., circular or oval). The area (hereinafter, "first area") of this shape defined by the through holes 41, 722 is preferably larger than the area (hereinafter, "second area") of the single through hole 42, 733 in the second guide plate 4b, 73. The first area is preferably at least 10% greater than the second area, more preferably at least 20% greater, more preferably, at least 30% greater.

Furthermore, the through holes 41, 742 in the third guide plate 4C, 74 also may be arranged, e.g., in a polygonal shape or an endless curved shape (e.g., circular or oval). The area (hereinafter, "third area") of this shape defined by the through holes 41, 742 is preferably larger than the area (hereinafter, "fourth area") of the through hole 51 in the molding die 5. The third area is preferably at least 10% greater than the fourth area, more preferably at least 20% greater, more preferably, at least 30% greater.

Additional teachings that may be advantageously utilized together with the teachings of the present application, such as compositions, sizes, arrangements, etc. of suitable thermoplastic polymers, reinforcing fibers, etc., are disclosed in U.S. patent application Ser. Nos. 17/464,996 and 17/530,519, the contents of which are fully incorporated herein by reference.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved dies for molding a reinforcing bar and methods of using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method for producing a reinforcing bar, comprising:
immersing and passing a plurality of strands of reinforcing fiber material through a bath of liquid thermoplastic resin material while at least once moving the strands outwardly away from each other in a direction perpendicular to a traveling direction of the strands and then inwardly converging the strands towards each other in the direction perpendicular to the traveling direction of the strands;
wherein:
the strands of the reinforcing fiber material are respectively passed through a plurality of through holes in a first guide plate to move the strands away from each other in the direction perpendicular to the traveling direction of the strands;
thereafter the strands are all passed through a single through hole in a second guide plate to move the strands towards each other in the direction perpendicular to the traveling direction of the strands;
the plurality of through holes in the first guide plate define a shape having a first area;
the single through hole in the second guide plate has a second area; and
the first area is at least 10% greater than the second area.

2. The method according to claim 1, further comprising:
prior to immersing in and passing the strands through the bath, loosening the strands of reinforcing fiber material.

3. The method according to claim 1, wherein the first area is at least 30% greater than the second area.

4. The method according to claim 3, wherein the shape defined by the through holes in the first guide plate is polygonal or endless curved shaped.

5. The method according to claim 4, wherein:
after passing through the single through hole of the second guide plate, the strands of the reinforcing fiber material are respectively passed through a plurality of through holes in a third guide plate to move the strands away from each other in the direction perpendicular to the traveling direction of the strands, and
thereafter the strands are all passed through a single through hole in a molding die to move the strands towards each other in the direction perpendicular to the traveling direction of the strands and to form the reinforcing bar.

6. The method according to claim 5, wherein:
the plurality of through holes in the third guide plate define a shape having a third area, and
the single through hole in the molding die has a fourth area that is smaller than the third area.

7. The method according to claim 6, wherein the third area is at least 30% greater than the fourth area.

8. The method according to claim 7, wherein:
an input side of the through hole of the molding die has a larger area than an output side of the through hole of the molding die, and
the output side of the through hole defines an outer diameter of the reinforcing bar.

9. The method according to claim 8, wherein:
the thermoplastic resin material is one or more of polypropylene, polyethylene, nylon and/or polyester, and
the reinforcing fiber material is one or more of basalt fibers, glass fibers, carbon fibers, aramid fibers and/or acrylic fibers.

10. The method according to claim 8, wherein:
the thermoplastic resin material comprises at least a majority of polypropylene, and
the reinforcing fiber material comprises at least a majority of basalt fibers.

11. The method according to claim 10, further comprising:
prior to immersing in and passing the strands through the bath, loosening the strands of reinforcing fiber material.

12. The method according to claim 1, wherein the shape defined by the through holes in the first guide plate is polygonal or endless curved shaped.

13. The method according to claim 1, wherein:
after passing through the single through hole of the second guide plate, the strands of the reinforcing fiber material are respectively passed through a plurality of through holes in a third guide plate to move the strands away from each other in the direction perpendicular to the traveling direction of the strands, and
thereafter the strands are all passed through a single through hole in a molding die to move the strands towards each other in the direction perpendicular to the traveling direction of the strands and to form the reinforcing bar.

14. The method according to claim 13, wherein:
the plurality of through holes in the third guide plate define a shape having a third area, and
the single through hole in the molding die has a fourth area that is smaller than the third area.

15. The method according to claim 14, wherein the third area is at least 30% greater than the fourth area.

16. The method according to claim 1, wherein:
the thermoplastic resin material is one or more of polypropylene, polyethylene, nylon and/or polyester, and
the reinforcing fiber material is one or more of basalt fibers, glass fibers, carbon fibers, aramid fibers and/or acrylic fibers.

17. A method for producing a reinforcing bar, comprising:
immersing and passing a plurality of strands of reinforcing fiber material through a bath of liquid thermoplastic resin material while at least once moving the strands outwardly away from each other in a direction perpendicular to a traveling direction of the strands and then inwardly converging the strands towards each other in the direction perpendicular to the traveling direction of the strands;
wherein:
the bath of liquid thermoplastic resin material is defined by a chamber;
guide means at least once outwardly moves the plurality of strands of reinforcing fiber material away from each other in the direction perpendicular to the traveling direction of the strands and then inwardly converges the plurality of strands towards each other in the direction perpendicular to the traveling direction of the strands, the guide means being submerged in the liquid thermoplastic resin held in the chamber;
the guide means comprises:
a first guide plate that guides the plurality of strands of the reinforcing fiber material away from each other in the direction perpendicular to the traveling direction of the strands; and
a second guide plate disposed downstream of the first guide plate and guiding the plurality of strands of the reinforcing fiber material towards each other in the direction perpendicular to the traveling direction of the strands;

the strands of reinforcing fiber material are respectively guided by through holes that are defined in the first guide plate and form a shape having a first area;

subsequently, all of the plurality of strands of reinforcing fiber material pass through a single through hole that is defined in the second guide plate and has a second area; and the first area is at least 10% greater than the second area.

18. The method according to claim 17, wherein the first area is at least 30% greater than the second area.

19. The method according to claim 18, wherein the shape defined by the through holes in the first guide plate is polygonal or endless curved shaped.

20. The method according to claim 19, wherein:

a third guide plate is disposed downstream of the second guide plate and has a plurality of through holes that move the strands away from each other in the direction perpendicular to the traveling direction of the strands, and a molding die is disposed downstream of the third guide plate and has a single through hole that receives all of the strands and moves the strands towards each other in the direction perpendicular to the traveling direction of the strands, thereby forming the reinforcing bar.

* * * * *